United States Patent [19]

Cosentino et al.

[11] Patent Number: 5,159,714
[45] Date of Patent: Oct. 27, 1992

[54] PORTABLE AUDIO MODULE WITH HEADREST

[76] Inventors: Bruno A. Cosentino, 38 New St., Eastchester, N.Y. 10709; Joseph V. Cocchirella, 80 Country La., Vernon, Conn. 06066

[21] Appl. No.: 572,032
[22] Filed: Aug. 23, 1990
[51] Int. Cl.⁵ ............................................. H04B 1/08
[52] U.S. Cl. .................................. 455/347; 455/351
[58] Field of Search ............... 455/344, 345, 346, 350, 455/351, 347; 381/159

[56] References Cited

U.S. PATENT DOCUMENTS 2,512,641  4/1947  Halstead .............................. 455/351
4,856,087  8/1989  Nesbit ................................. 455/351

FOREIGN PATENT DOCUMENTS 0015465  12/1933  Australia .

Primary Examiner—Curtis Kuntz
Attorney, Agent, or Firm—Chilton, Alix & Van Kirk

[57] ABSTRACT

A portable audio module such as a radio/cassette player incorporates a headrest which is disposed between the speakers. The headrest is hinged to the case and is pivotal for accessing a compartment. The compartment may include a cassette player including a cassette deck and controls therefor. The case and the controls are constructed so as to inhibit penetration by water, sand and the like.

18 Claims, 5 Drawing Sheets

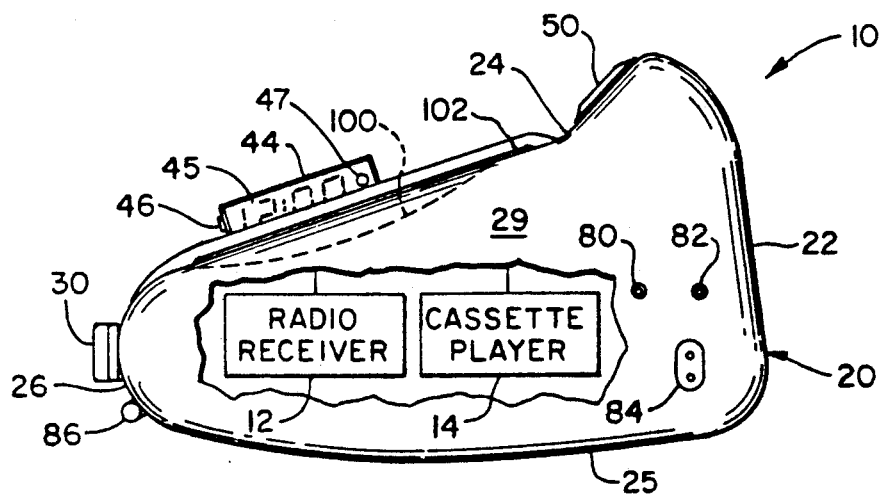
FIG. 3
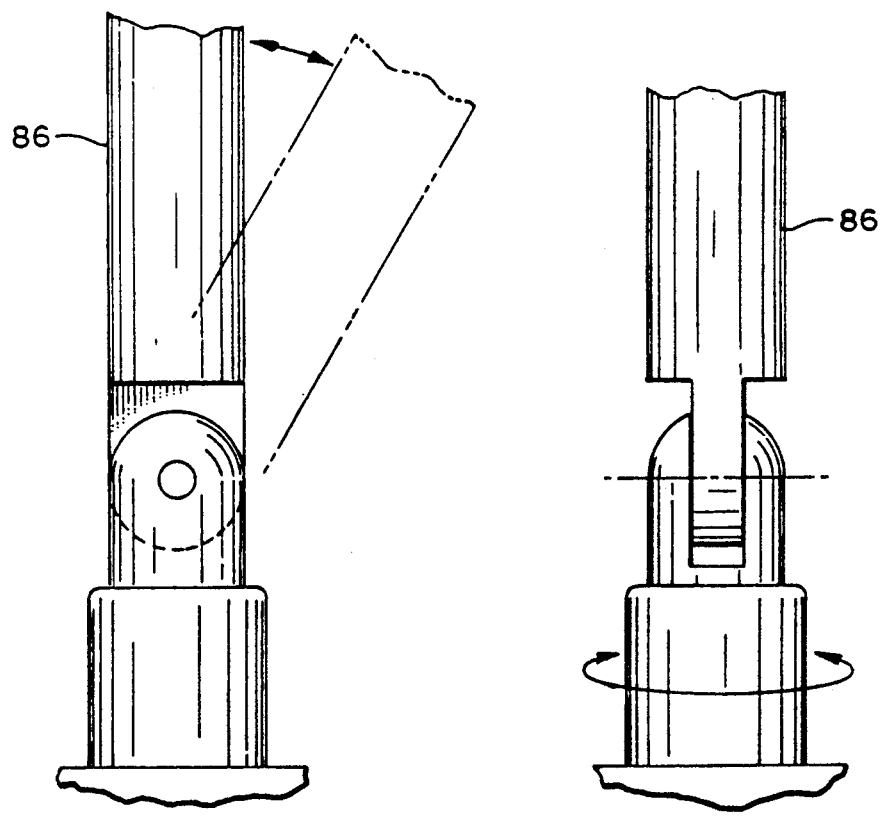
FIG. 9
FIG. 10

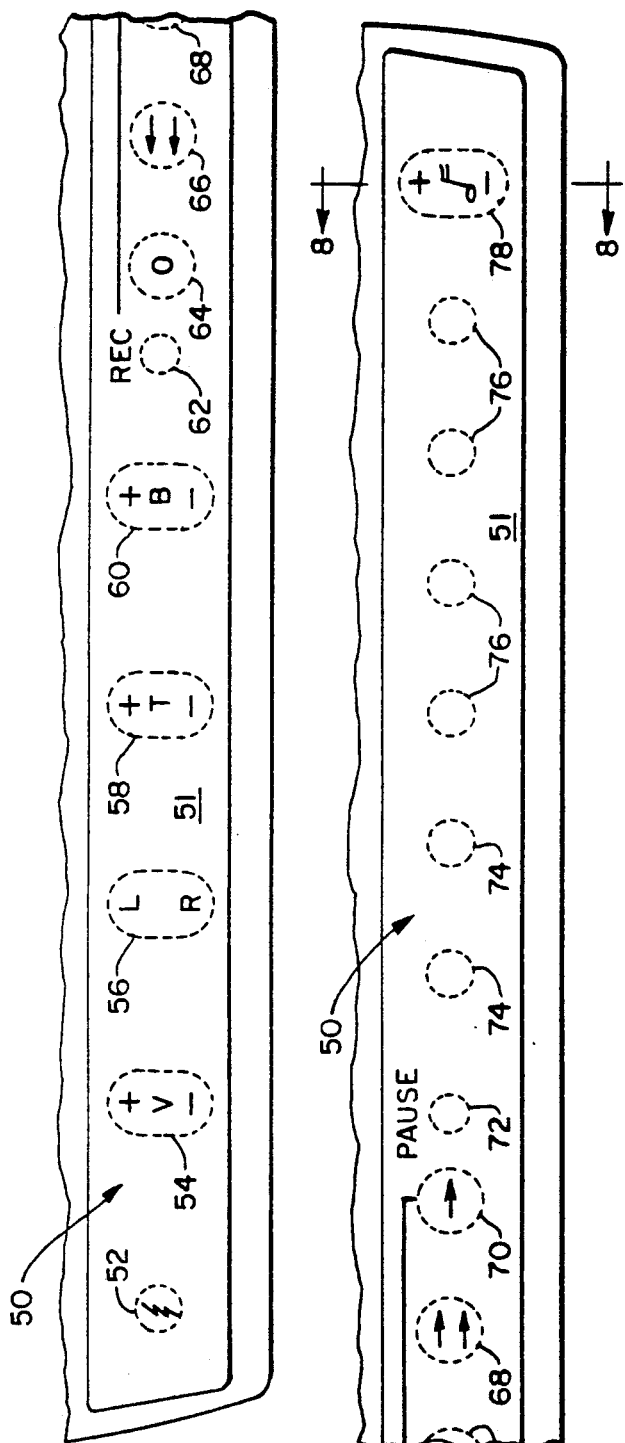
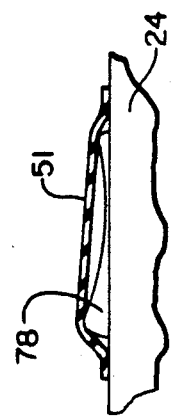
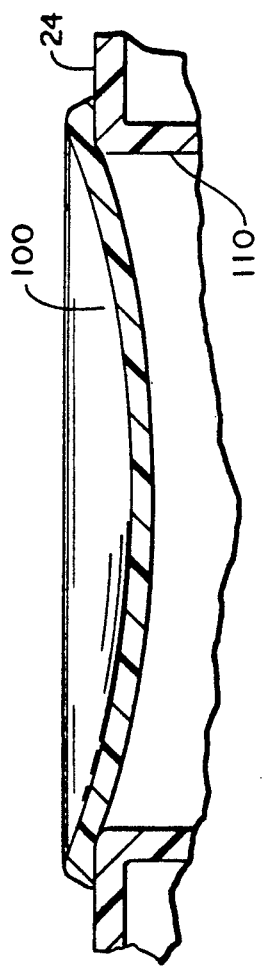

PORTABLE AUDIO MODULE WITH HEADREST

BACKGROUND OF THE INVENTION

This invention relates generally to portable radios, cassette recorders and other audio devices. More particularly, the present invention relates to audio devices which are particularly suitable for usage at a beach or summer recreation area.

Portable radios, cassette players and various audio devices have been configured in a wide variety of models, styles and shapes which are especially adapted for various recreational applications. Among the most severe environments for such devices is a beach area wherein both sand and water can damage the audio device. While audio devices have been configured in a wide variety of module shapes and configurations, few have been particularly adapted for use at the beach or a leisurely summer environment.

SUMMARY OF THE INVENTION

Briefly stated, the invention in a preferred form is an audio module which is particularly adapted for use at a beach or similar environment wherein a headrest is constructed and integrated into the module. The portable audio module comprises a case which encloses the audio circuitry. A pair of laterally spaced speakers communicate with the audio circuitry and are located at one face of the case. A compartment for a cassette recorder is formed in the case. A headrest is located between the speakers and is hingably mounted to the case. The headrest is pivotal between an open and a closed position. In the open position, the headrest permits access to the compartment for operating the cassette player. In the closed position, the compartment is closed and the headrest is functional. The cassette player is operable in the closed position. The headrest is contoured to be at least partially recessed into the face of the case to provide a comfortable head support.

An object of the invention is to provide a new and improved audio module having a headrest.

Another object of the invention is to provide a new and improved portable audio device which is suitable for a beach environment.

A further object of the invention is to provide a new and improved portable radio and cassette player which incorporates a headrest so that a listener may comfortably recline his head on the headrest while the audio device is operative.

Other objects and advantages of the invention will become apparent from the drawings and the specification.

BRIEF DESCRIPTION OF THE DRAWINGS

FIG. 3 is an end elevational view, partly broken away, partly in schematic and partly in phantom, of the portable audio module of FIG. 1, viewed from the right thereof;

FIG. 5 is an enlarged fragmentary side view of a portion of the control panel of the portable audio module of FIG. 2;

FIG. 6 is an enlarged fragmentary side view of a second portion of the control panel of the portable audio module of FIG. 2;

FIG. 7 is an enlarged sectional view of the headrest portion of FIG. 2 taken along the line 7—7 thereof;

FIG. 8 is an enlarged sectional view of the control panel portion of FIG. 6 taken along the line 8—8 thereof;

FIG. 9 is an enlarged framentary view of the antenna mount for the portable audio module of FIG. 3; and FIG. 10 is a second enlarged fragmentary view of the antenna mount for the portable audio module of FIG. 1.

DETAILED DESCRIPTION OF THE PREFERRED EMBODIMENT

With reference to the drawings wherein like numerals represent like parts throughout the figures, a portable audio module in accordance with the present invention, is generally designated by the numeral 10. Module 10 is preferably in the form of a portable radio and cassette player although other audio devices are also possible. The portable module 10 is especially adapted for use in a beach environment and is constructed to be resistant to sand, water and other marine elements.

Figure 1:
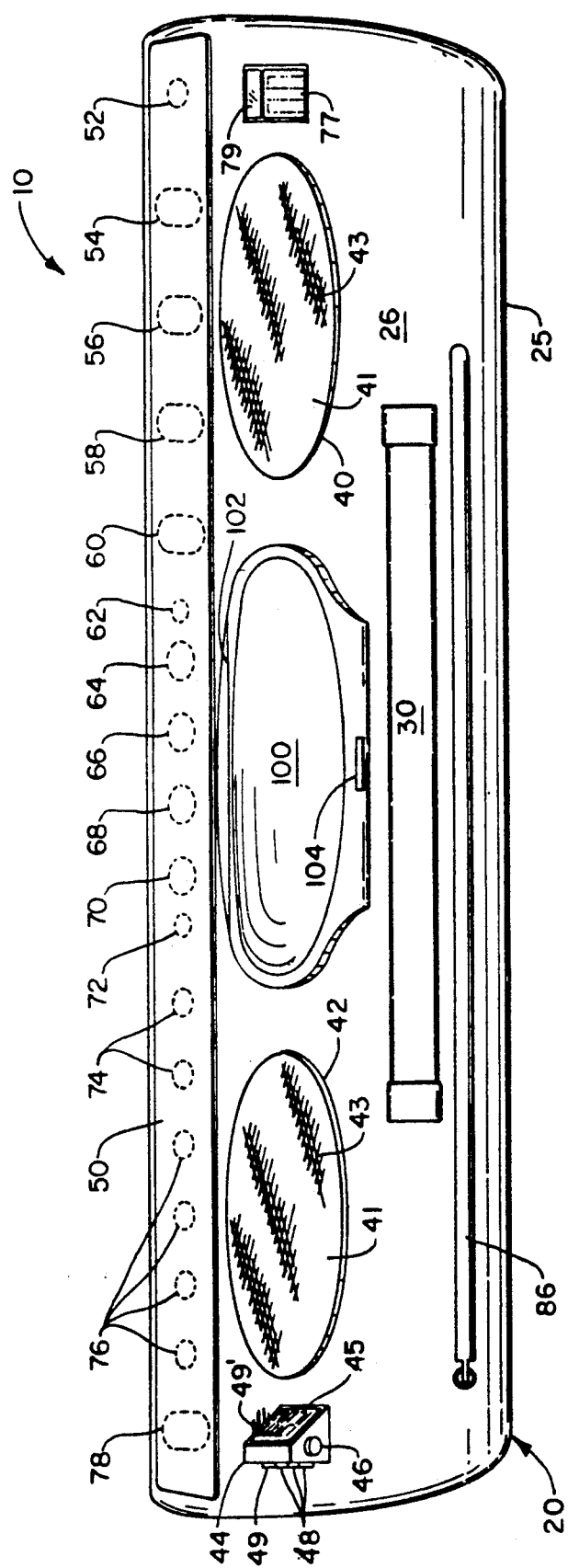
FIG. 1 is a top plan view of a portable audio module having a headrest in accordance with the present invention.
Figure 2:
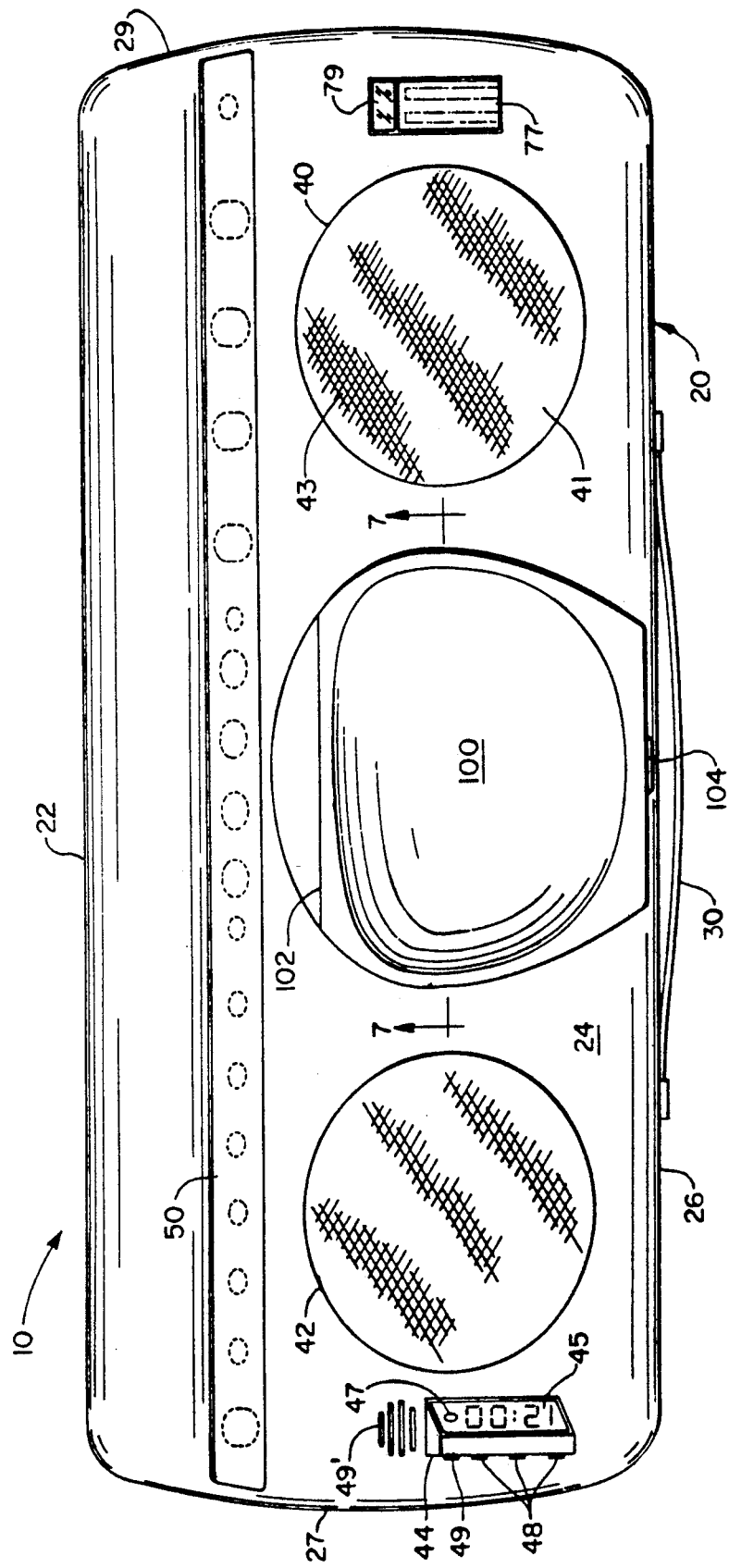
FIG. 2 is a side view of the portable audio module of FIG. 1 viewed from the top thereof.

The module includes a case 20 which preferably encloses a radio receiver 12 and a cassette player 14. The case preferably has a generally smooth contoured surface. The case is manufactured from a durable ABS plastic to form an impact resistant housing. The module is designed to have two functional positions as best illustrated respectively in FIGS. 1 and 2 which for descriptive reasons will be respectively designated as the upright (FIG. 1) and reclined (FIGS. 2 and 3) positions. In FIGS. 1 and 2, the portable audio module 10 rests on a surface parallel to the plane of the figures.

For purposes of describing the invention, case 20 is designated with reference to the upright position of FIG. 1 as comprising a bottom panel 22 (not illustrated in FIG. 1), a front panel 24, an obverse panel 25, a top panel 26 and opposing end panels 27 and 29. It should be appreciated that the noted panels are contoured so as to not have well defined edges at their respective interfaces. The module is adapted to rest in a stable manner on the bottom panel 22 in the upright position. In the second reclined position (best illustrated in FIG. 3), the front panel 24 becomes the top panel as will be detailed below and the module rests in a stable manner on the obverse panel 25. Panels 22 and 25 may define support legs to ensure stable upright and reclined positions. The panels may have a wide range of shapes and dimensions. A shoulder strap (not illustrated) and/or a nylon handle 30 may be mounted to the top panel 26 to facilitate the portability of the module.

Figure 4:
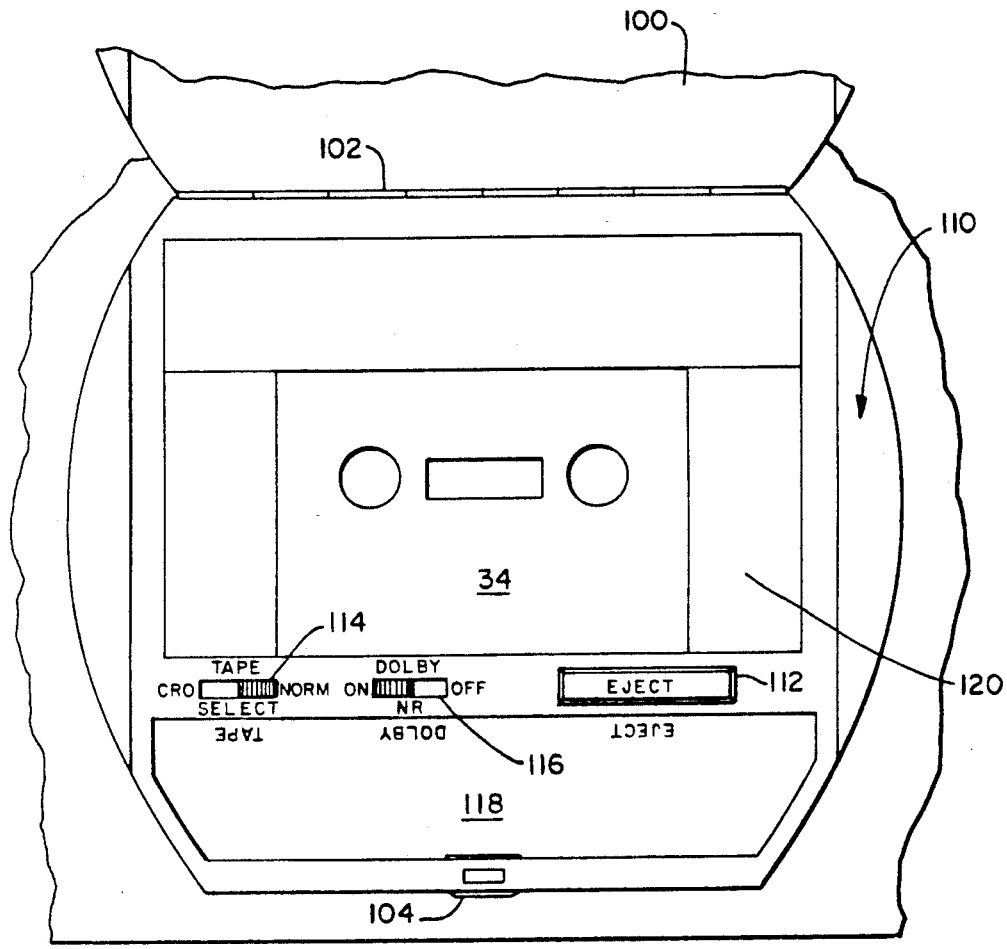
FIG. 4 is an enlarged view of the headrest portion of the portable audio module of FIG. 1 illustrated in an open position.

The case 20 houses various circuitry and components for the radio receiver 12 and the cassette player 14 (partially illustrated in FIG. 4). The cassette player 14 may both play and record. Speakers 40 and 42 are located at the front panel 24 in laterally spaced relationship. The speakers, which may, for example, be 4½ inch speakers rated for 25 watts, are structured and sealed with the panel so as to be impervious to sand, dirt and water. The speaker covers comprise a nylon mesh membrane 41 which is covered by a plastic grid 43. The speakers communicate with the audio systems in a conventional manner.

At one end of the front panel 24 is a display unit 44 which has a digital display face 45 extending at substantially a 45° angle to the panel 24. The display face 45 has an LCD display for indicating the radio channel and/or an AM/PM time indicator as desired. The display unit includes a station recall button 46, an LCD stereo indicator 47, various LCD clock/hour/minute time set buttons 48, and alarm-set button 49 for manually selecting the time or the radio station display. All display buttons are located on side of digital display face. A built-in microphone 49' is also provided.

With additional reference to FIGS. 5 and 6, control panel 50 includes a linear arrangement of various controls and knobs such as an on/off switch 52, a volume control knob 54, a balance control knob 56, a treble control knob 58, a base control knob 60, a cassette player record button 62, a cassette player stop control knob 64, a cassette player rewind control knob 66, a cassette player fast forward control knob 68, a cassette player play control knob 70, a cassette player pause button 72, preset AM buttons 74, preset FM buttons 76, and an AM/FM radio tuner 78. The foregoing knobs and controls are conventional in form and function except that they are specifically constructed to be resistant to water, sand and the elements. With additional reference to FIG. 8, the face of the control panel 50 is covered by a rubber gasket-like membrane 51. The membrane 51 allows for manipulation of the various controls and knobs. The membrane seals against panel 24 to prevent the penetration of water, sand and other matter into the inner mechanical actuation regions of the controls and knobs. An audio level indicator 77 and a power on light 79 are also located at panel 24.

With reference to FIG. 3, a headphone jack plug 80, a microphone jack plug 82 and an AC power adapter plug 84 may be located at the panel 27.

With additional reference to FIGS. 9 and 10, a flexible rubber encased antenna 86 is also mounted to the casing. The antenna 86 may be universally pivoted as illustrated in FIGS. 9 and 10.

The foregoing controls and features are described for purposes of illustration and are not to be deemed as limitations of the invention. In the illustrated embodiment, the audio device is capable of AM/FM radio reception and playing and recording cassette tapes. Not all embodiments of the invention need include all of the multiple audio functions.

In accordance with the invention, a headrest, designated generally by the numeral 100, is disposed between the speakers 40 and 42. The headrest is mounted to the base by a reinforced hinge 102 and functions as a cover which is pivotal between opened and closed positions. A latch 104 secures the headrest in the closed position. The headrest 100 is constructed of a durable water resistant material such as vinyl covering a padded cushion of foam rubber which has a hard plastic back. The headrest is shaped, dimensioned and located so that a person may easily recline his head on the headrest in a comfortable fashion when the module is in the reclined position. (FIGS. 2 and 3) The headrest is recessed in a generally concave fashion into the case as illustrated in FIGS. 3 and 7. In one embodiment, the recess depth is on the order of ½ inch. The headrest is oriented at an acute angle to the support surface when the module is in the reclined position.

The headrest encloses a compartment 110 for the cassette player and the battery power supply. In the pivoted open position illustrated in FIG. 4, the compartment provides access to an eject button 112, a two-function tape selector 114, and a noise/reduction switch control function switch 116. A plate 118 covers battery compartment which may, for example, receive six 'C' size batteries (not illustrated). The cassette compartment 110 also includes a cassette deck 120.

It will be appreciated that the portable audio module is adapted to have two positional modes. In a first functional position, the module rests on the bottom panel 22. The module functions in a conventional manner to provide a portable radio and cassette player with the various controls. The speakers are disposed in a laterally spaced upright position and the control panel is positioned below the speakers in a conventional manner. The cassette player is disposed in the compartment 110 which is accessed by the pivotal headrest 100.

In a second recreational position, the module is reclined on the obverse panel 25 so that the headrest 100 may be used by the listener as a padded head support while the listener is reclined with both the portable radio and the cassette player being fully operable. In the recreational mode, the individual may directly view the display unit 44 while reclining on the headrest. It should be appreciated that the speakers 40 and 42 are in close proximity to the headrest 100 (and the listener) to provide a high quality of sound which can be maintained at a relatively low volume.

In a preferred form, the case is formed from a smooth durable plastic which is preferably tinted to have a beach-type neon color. For example, the casing may be made of a durable ABS-type plastic having a bright orange tint. The power rating for the radio may be on the order of 25 watts. Naturally, other power ratings and dimensions of the speakers and the casing are possible.

It should be noted that the exterior surface of the headrest can be affixed with a manufacturer's logo, art work or promotional symbols.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A portable audio module comprising:
   audio means for generating sound;
   case means enclosing said audio means and comprising a first face;
   a pair of laterally spaced speakers communicating with said audio means and located at said first face;
   compartment means for defining a compartment in said case means; and
   headrest means located between said speakers for receivably supporting the reclined head of a listener, said headrest means comprising a headrest mounted to said case means, at least a portion of said headrest being pivotal between an opened position and a closed position, said headrest in said opened position permitting access to said compartment and in said closed position closing said compartment.

2. The portable audio module of claim 1 wherein said headrest has a generally concave shape which is partially recessed relative to said first face.

3. The portable audio module of claim 1 further comprising a second face generally opposite said first face wherein when said second face rests on a generally planar surface, said headrest is oriented at an acute angle relative to said planar surface.

4. The portable audio module of claim 1 wherein said headrest is mounted to said case by means of a hinge.

5. The portable audio module of claim 1 further comprising a control panel located at said first face.

6. The portable audio module of claim 5 wherein said control panel further comprises a plurality of control knobs for said audio means and covering means overlying said knobs and sealed to said case means so as to permit manual operation of said knobs and prevent elements external to said module from contacting said knobs.

7. The portable audio module of claim 1 further comprising display means projecting from said first face for displaying the time and the radio frequency.

8. The portable audio module of claim 7 wherein the display means comprises a digital display disposed at an angle of approximately 45° relative to said first face.

9. The portable audio module of claim 1 further comprising a cassette player including a cassette deck and controls therefor disposed in said compartment.

10. The portable audio module of claim 1 further comprising sealing means for sealing said speakers to said case means to inhibit penetration by liquids and particulate matter.

11. The portable audio module of claim 1 further comprising a battery power supply mounted in said case and accessible through said compartment.

12. The portable audio of module of claim 1 wherein said case means is supportable in a stable orientation in a first orientation wherein said first face is disposed generally at the top and a second orientation wherein said first face is upright.

13. A portable audio module comprising:

radio means for receiving radio waves and generating an audially perceivable signal;

case means enclosing said radio means and comprising a first face, a second face generally opposite said second face and a third face;

a pair of laterally spaced speakers communicating with said radio means and located at said first face;

compartment means for defining a compartment in said case means between said speakers;

headrest means located between said speakers for receivably supporting the head of a listener, said headrest means being pivotal between a closed position for closing said compartment and an opened position for accessing said compartment, wherein when said module rests on said second face, said first face is oriented in a stable orientation at generally the top of said module, and when said module rests on said third face, said first face is disposed in a generally upright stable orientation.

14. The portable audio module of claim 13 further comprising a control panel disposed at said first face, said control panel comprising a generally linear array of control knobs for said radio means.

15. The portable audio module of claim 14 further comprising a flexible member overlying said control knobs and sealably mounted to said case means.

16. The portable audio module of claim 13 wherein the headrest means comprises a resilient concave shaped headrest which is oriented at an acute angle to the support surface when the second face rests on said support surface.

17. The portable audio module of claim 16 wherein said headrest is mounted to said case means by means of a hinge.

18. The portable audio module of claim 13 further comprising a display module protruding from said first face, said display module being visible to a listener while the listener's head is reclined on said headrest.

* * * * *

UNITED STATES PATENT AND TRADEMARK OFFICE
CERTIFICATE OF CORRECTION

PATENT NO. : 5,159,714

DATED : October 27, 1992

INVENTOR(S) : Bruno A. Cosentino and Joseph V. Cocchiarella

It is certified that error appears in the above-identified patent and that said Letters Patent is hereby corrected as shown below:

On the title page, item [76] Inventors, "Cocchirella" should read --Cocchiarella--.

Signed and Sealed this

Twenty-third Day of November, 1993

Attest:

BRUCE LEHMAN

Attesting Officer        Commissioner of Patents and Trademarks